US012640163B2

(12) United States Patent
Sinha et al.

(10) Patent No.: US 12,640,163 B2
(45) Date of Patent: May 26, 2026

(54) METHOD AND SYSTEM FOR IDENTIFYING SIMILARITY BETWEEN TWO AUDIO TRACKS

(71) Applicant: Audio Technologies and Codecs, Inc., Chatham, NJ (US)

(72) Inventors: Deepen Sinha, Chatham, NJ (US); Mohd Aamir Khan, Bisrakh (IN)

(73) Assignee: Audio Technologies and Codecs, Inc., Chatham, NJ (US)

( * ) Notice: Subject to any disclaimer, the term of this patent is extended or adjusted under 35 U.S.C. 154(b) by 198 days.

(21) Appl. No.: 18/417,674

(22) Filed: Jan. 19, 2024

(65) Prior Publication Data

US 2025/0069618 A1 Feb. 27, 2025

Related U.S. Application Data

(60) Provisional application No. 63/578,655, filed on Aug. 24, 2023.

(51) Int. Cl.
*G10L 25/51* (2013.01)
*G10L 25/18* (2013.01)

(52) U.S. Cl.
CPC .............. *G10L 25/51* (2013.01); *G10L 25/18* (2013.01)

(58) Field of Classification Search
CPC ......... G10L 25/51; G10L 25/18; G10L 25/54; G10L 25/00; G10L 25/90; G06F 16/40; G06F 16/48
See application file for complete search history.

(56) References Cited

U.S. PATENT DOCUMENTS 6,542,869 B1 * 4/2003 Foote .................... G06F 16/634 704/E15.005
2006/0080356 A1 * 4/2006 Burges .................... G06F 16/48
2008/0300702 A1 * 12/2008 Gomez ................... G10L 25/48 700/94
2014/0343933 A1 * 11/2014 Zhao ....................... G10L 25/00 704/207
2014/0366710 A1 * 12/2014 Eronen .................... G10H 1/00 84/609
2018/0374491 A1 * 12/2018 Wang ...................... G11B 27/28
2019/0341011 A1 * 11/2019 Neuhauser .............. G10L 25/81
2020/0228596 A1 * 7/2020 Fuzell-Casey ........ G06F 16/634

FOREIGN PATENT DOCUMENTS

CN 103871426 A * 6/2014
CN 104810025 A * 7/2015
CN 109087669 A * 12/2018 ............. G10L 25/51

* cited by examiner

*Primary Examiner* — Yogeshkumar Patel

(57) ABSTRACT

The invention provides a method for identifying similarity between two audio files or tracks. The method comprises receiving a processed audio file and an original audio file, uncompressing the processed audio file, applying global loudness normalization and short-term loudness normalization on the processed audio file and the original audio file, converting the processed audio file and the original audio file into processed spectral image by time-frequency mapping, scaling, using linear interpolation, the processed spectral image, dividing the scaled-up processed spectral image into slices, searching for minimum Sum of Absolute Difference (SAD), using original spectral image as reference, for each slice.

10 Claims, 5 Drawing Sheets

METHOD AND SYSTEM FOR IDENTIFYING SIMILARITY BETWEEN TWO AUDIO TRACKS

CROSS-REFERENCE TO RELATED APPLICATION

This application claims the benefit of U.S. Provisional Patent Application No. 63/578,655, filed Aug. 24, 2023, which is incorporated by reference herein in its entirety.

FIELD OF THE INVENTION

The present invention relates generally to audio processing. More specifically, embodiments of the present invention relate to method and system for reliably and efficiently identifying the similarity between an original and a candidate audio file, under the constraint that the candidate may be a. somewhat modified and/or processed version of the original audio files. The types of audio files may include items such as recorded music or speech and live performances.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

The audio broadcasting industry necessitates extensive database management. Identifying similar kinds of audio in the database are one of the important problems. As a result, there are times when it is advantageous to search for one or more music signals from a large database which closely matches a chosen original piece of music. In such applications one needs to ascertain if a candidate audio files from the database closely resembles the original music sample. In practical applications this search needs to be performed under the additional constraint that the match candidate is a somewhat different version of the original piece of music, e.g., a live performance vs a studio recording of the same song, or it has gone through some processing. Numerous types of processing may be found in real life, such as samples could be truncated, or silence added in beginning and end of a sample, time scale could be different (time dilation) and even the time scale difference could be variable with time, digital audio parameters such as sample rate, bit-depth, and number of channels could be different. Further variations in samples may be found such as processing for audio enhancement, bass enhancement, equalization, or loudness normalization, gain/attenuation application, low pass filtering (e.g., 8 kHz, 4 kHz), bit rate compression to a lower bit rate using codecs such as HE-AAC, MP3/MP2, or other techniques. The search technique should identify a good match under all such variations of the same piece of music, i.e., it must be robust to all such variations.

Different techniques have been used earlier for identifying the match and similarity between the music samples. But these techniques have their limitations, for example often a technique based on block correlation in the time domain between signals is used for detecting matches. But it has limitations in the case of different time scales of samples being compared. Even if samples are un-dilated i.e., have the same time scale, such technique fails when signals are highly processed. Further, another limitation may be that a relatively simple technique is used for estimating the time scale difference between samples which uses the end point of the samples. The time dilation factor in this case will be DF=N/M (N is the original file length and M is the processed file length), but due to truncation and silence additions in processed samples, this approach fails. Furthermore, it is more cumbersome to identify time-scale change when the time scale difference varies with time. If methods using machine learning are applied, such as those based on deep learning algorithms such as CNN or LSTM, training the model is extremely difficult because it needs a large training database for accurate results.

US20060080356A1 provides a system for inferring similarities between media objects in an authored media stream. The disclosed system determines a similarity score between a number of media objects based on at least one ordered list, identifies media objects and their relative positions within at least one media stream, and generates at least one ordered list representing the media objects' relative positions within at least one media stream.

U.S. Pat. No. 9,183,849B2 provides a system, apparatus, and method for determining semantic information from audio, where incoming audio is sampled and processed to extract audio features, including temporal, spectral, harmonic, and rhythmic features. The stored audio templates, which include ranges and/or values for particular features and are tagged for specific ranges and/or values, are compared to the extracted audio features. The tagged information is used to identify audio features that are most similar to one or more templates from the comparison and may be associated with the semantic information. The semantic audio data, which includes the audio signal's genre, instrumentation, style, acoustic dynamics, and emotive descriptor, is determined by using the tags.

CN104091598A discloses an audio file similarity calculation method and device. The steps that are taken to create a first audio file's pitch sequence and a second audio file's pitch sequence are included in the method. An eigenvector of the first audio file is calculated using the pitch sequence of the second audio file, and an eigenvector of the second audio file is calculated using the pitch sequence of the first audio file. The similarity between the first and second audio files is calculated using the first audio file's eigenvector and the second audio file's eigenvector, respectively.

CN109087669B discloses a kind of audio similarity detection method. Obtaining audio for detection is part of the disclosed method. In addition, the audio for meeting the preset condition is removed from the audio that must be detected and described to be checked in accordance with the audio acquisition that removed the characteristic acoustic frequency sequence. In addition, the method involves obtaining the benchmark audio's reference characteristic sequence, calculating the similarity distance between the to-be-detected audio's characteristic sequence and the benchmark audio's reference characteristic sequence, and then comparing the similarity between the to-be-detected audio and benchmark audio.

CN103871426A discloses a method and a system for comparing the similarity between user audio and original audio, using techniques belonging to the audio frequency processing field. The process consists of obtaining characteristics from audio segments, optimizing those characteristics with the help of a normalization technique, and utilizing the DTW algorithm to carry out similarity comparisons on the optimized characteristics of audio segments in order to achieve similarity comparisons between user audio and the original audio. It is claimed that the similarity between user audio and the original audio can be effectively compared using this document's scheme, and the method and system can be widely used in the music industry for things like commenting on user audio and identifying inferior audiovisual products.

CN104810025B relates to an audio similarity detecting method and device. Acquiring an audio signal to be evaluated is one of the steps in the method; obtaining a spectrum of the audio signal in accordance with the audio signal that will be evaluated; recognizing the audio signal spectrum's peak position; acquiring the peak position-corresponding feature value and time point; obtaining a first time sequence of the audio signal, which will be evaluated for each feature value and time point; comparing a second time sequence to the first one; determining the comparison result's similarity between the evaluation audio signal and the reference audio signal, where the second time sequence is the reference audio signal's pre-obtained time sequence that corresponds to the evaluation audio signal. It is claimed that audio signal can be evaluated quickly and accurately by using the method and the device. The device and method can be used in a variety of application scenes.

Technologies such as those disclosed in to while useful are not robust to all the variations listed in and fail under one or more of these. In view of the foregoing, there is a need for an improved and efficient method and system for robustly identifying similarities or matches between a candidate and an original audio file that has high rate of success under all these possible variations in samples.

The present application provides these and other advantages as will be apparent from the following detailed description and accompanying figures.

The other approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

BRIEF SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

It is an object of the invention to provide an improved robust and efficient method and system for identifying similarities or matches between an original audio file and a candidate audio file, which may be a part of a broadcast database consisting of several audio files. The method and system finds the two audio files to be identical even if one may have undergone variations with respect to the other in ways described in in [0004].

According to an illustrative embodiment, the disclosure provides a robust method and a system for identifying a match or similarity between a candidate music audio file and an original file. The disclosed system and method disclose the use of a matching algorithm that provides correct matching scores, the best estimation of the dilation factor, and other parameters.

In the invention, new measures are developed and utilized for getting a better sense of match between similar samples. Conventional correlation-based similarity measure does not suffice for identifying the match between samples that are heavily processed or are different performances. Hence, the deficiency is cured by a new Sum of Absolute Difference (SAD)-based "Signature Score" measure which is perfect for detecting the match between highly processed samples. It provides information that samples are of the same signature i.e., they have same musical origin and are perceptually very similar. In addition to providing a robust match, the new Signature Score based similarity measure gives a sense that how perfectly they are matching (numerically). It depends on the degree of processing in the processed signal.

In an illustrative embodiment, the invention provides a method for identifying the similarity between two audio files or tracks. The method comprises receiving a potentially varied candidate audio file and an original audio file, uncompressing the original as well as candidate audio files (in case one or both of them are provided in compressed audio format such as MP3), applying global loudness normalization and short-term loudness normalization on the candidate audio file and the original audio file, converting the candidate audio file and the original audio file into a processed spectral image by time-frequency mapping, scaling, using linear interpolation on the processed spectral images, dividing the scaled-up processed spectral image into slices, searching for minimum Sum of Absolute Difference (SAD), using an original spectral image as reference, for each slice. The method further comprises determining the edited duration and dilation factor in the candidate audio file, applying, based on the dilation factor of the candidate audio file, time unwarping to the candidate audio file and the original audio file, removing, extra edited frames of candidate audio from the original audio file, determining a first similarity measure, by computing a correlation coefficient between un-warped candidate audio and original audio file and calculating, by SAD search, signature measure between un-warped candidate audio and the original audio file, and performing, histogram analysis of SAD search vectors for calculating the new Same Signature score calculation. The method then makes a determination about the two audio files being essentially the same by apply a threshold to the Signature Score and outputs this decision along the computed parameters, viz dilation factor, original loudness, candidate loudness, editing parameters, i.e., start cut in candidate, end cut in candidate, start silence in candidate, end silence in the candidate, reference points, i.e. start/end points in candidate, and start/end points in original audio file.

In another illustrative embodiment of the present invention, a system for identifying similarity between two audio files is disclosed. The disclosed system comprises a processor configured to receiving a processed potentially varied candidate audio file and an original audio file, uncompressing the processed original as well as candidate audio files (in case one or both of them are provided in compressed audio format such as MP3), applying global loudness normalization and short-term loudness normalization on the processed candidate audio file and the original audio file, converting the processed candidate audio file and the original audio file into a processed spectral image by time-frequency mapping, scaling, using linear interpolation on, the processed spectral images, dividing the scaled-up processed spectral image into slices, searching for minimum Sum of Absolute Difference (SAD), using an original spectral image as reference, for each slice. Further, the processor is configured determine the edited duration and dilation factor in the processed candidate audio file, applying, based on the dilation factor of the processed candidate audio file, time unwarping to the processed candidate audio file and the original audio file, removing, extra edited frames of processed candidate audio from the original audio file, determining a first similarity measure, by applying computing a correlation coefficient between un-warped processed candidate audio and original audio file and calculating, by SAD search, signature measure between un-warped processed candidate audio and the original audio file, and performing, histogram analysis of SAD search vectors for calculating the new Same Signature score calculation. The processor then makes a determination about the two audio files being essentially the same by apply a threshold to the Signature Score and outputs this decision along the computed parameters, viz dilation factor, original loudness, candidate loudness, editing parameters, i.e., start cut in candidate, end cut in candidate, start silence in candidate, end silence in the candidate, reference points, i.e. start/end points in candidate, and start/end points in original audio file.

To further clarify the advantages and features of the present disclosure, a more particular description of the disclosure will be rendered by reference to specific illustrative embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

Figure 1:
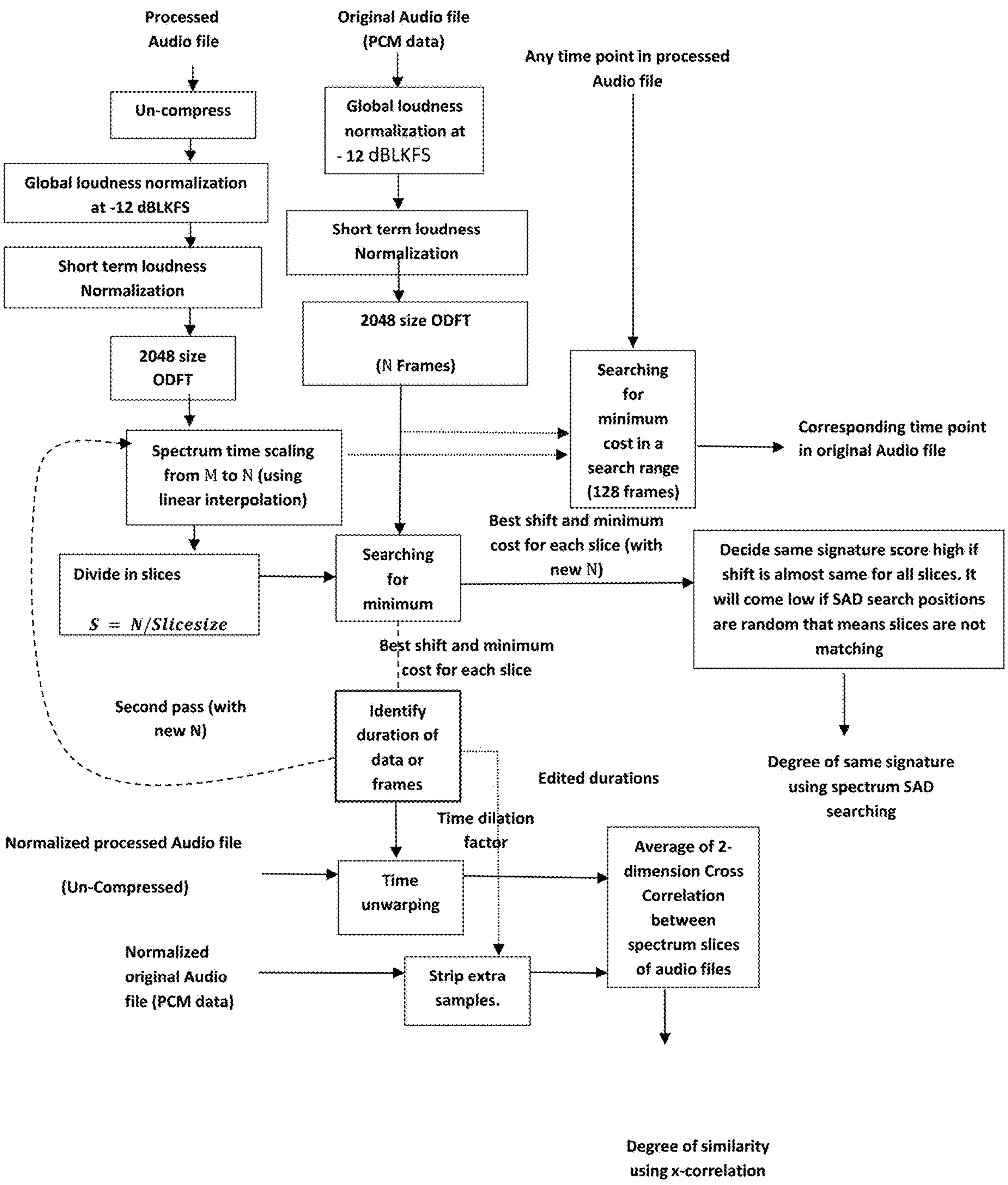
FIG. 1 illustrates a block diagram of the system for identifying similarity between two audio files, in accordance with an embodiment of the present invention.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings and the description below, i.e., the "illustrative embodiment", and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

In the description below, the term "illustrative embodiment" may be used singularly—i.e., the illustrative embodiment; or it may be used plurally—i.e., illustrative embodiments and neither is intended to be limiting. Moreover, the term "illustrative" as used herein is to be understood as "none or one or more than one or all." Accordingly, the terms "none," "one," "more than one," "more than one, but not all" or "all" would all fall under the definition of "illustrative." The term "illustrative embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below.

Although the illustrative embodiments of the present invention will be described in the following description in relation to an audio signal, one should keep in mind that concepts taught in the present invention equally apply to other types of signals, in particular but not exclusively to various type of speech and non-speech sound signals.

The present invention provides an improved robust and efficient method and system for identifying similarities or matches between an original and candidate music audio file found in the broadcast database. The present disclosure outlines a novel highly robust matching algorithm for identifying the similarity or match between original and potentially modified/processed candidate music present in broadcast databases. The disclosed algorithm is based on both spectral and temporal analysis of audio and is an example of an advanced rule-based expert system or Artificial Intelligence.

The present disclosure includes an algorithm description that estimates the degree of similarity, Same Signature Score, reference points, and time dilation between two input audio files. The two input audio files comprising the original audio file and a candidate audio file which may be potentially modified/processed version of the original audio file. The processed audio file is potentially compressed using an audio compression codec—e.g., ISO Moving Picture Expert Group (MPEG)—Layer II (MP2), ISO MPEG Layer III (MP3), or ISO MPEG Advanced Audio Coder (AAC), recorded at a higher tempo, edited for length, processed or loudness normalized for rms, low-pass filtered, or may even be a somewhat different mix (e.g., studio vs. live performance). On the other hand, in one such application, the original audio file may be uncompressed and the user intention is that it could replace the processed audio file in broadcast database based on the degree of similarity.

In an illustrative embodiment of the present invention, the disclosed method and system provide the following outputs:

a) Time dilation in candidate audio as compared to the original audio.
b) Duration of audio edited in starting and beginning of candidate audio as compared to the original audio.
c) Degree of similarity between candidate file and original audio file after eliminating the impact of tempo change (time dilation), rms normalization, and audio editing in candidate file.
d) A numerical Same Signature score between candidate file and original audio file after eliminating the impact of tempo change (time dilation), rms normalization, and audio editing in candidate file. If the candidate file is too much processed, then the similarity measure based on conventional correlation could come low but the Same Signature Score will come high.
e) Mapping of arbitrary time points in candidate file to the original file. Two-time points would be selected near to start and end of the candidate file and corresponding points will be calculated in the original file. User could also provide arbitrary points in the candidate file and will get upon return corresponding points in the original file.
f) ITU-R BS.1770 Standard Loudness measures [International Telecommunication Union, Recommendation ITU-R BS. 1770-3, "Algorithms to measure audio program loudness and true-peak audio level", Broadcast Standards series] of both input files.

In an illustrative embodiment of the present invention, the techniques proposed in the disclosed method and system detect the best matching between similar samples and provide excellent similarity scores between the samples. The matching algorithm is based on loudness processing, frequency domain transformation using Fast Fourier Transform (FFT), interpolation techniques, Sum of Absolute Difference (SAD) analysis/searching in the frequency spectrum for dilation factor detection, frequency domain 2D-correlation measure, and histogram analysis of SAD search vectors for same signature score calculation.

In an illustrative embodiment of the present invention, FIG. 1 illustrates a block diagram of the system for identifying similarities between two audio files, in accordance with an embodiment of the present invention. The block diagrams as shown in FIG. 1 shows the method steps comprising receiving a candidate audio file (referred to as processed audio file or target audio file in the figure) and an original audio file, uncompressing the processed audio file, applying global loudness normalization and short-term loudness normalization on the processed audio file and the original audio file, converting the processed audio file and the original audio file into the processed spectral image by time-frequency mapping, scaling, using linear interpolation, the processed spectral image, dividing the scaled-up processed spectral image into slices, searching for minimum Sum of Absolute Difference (SAD), using an original spectral image as reference, for each slice. The block diagram further shows the method comprising determining the edited duration and dilation factor in the processed audio file, applying, based on the dilation factor of the processed audio file, time unwarping to the processed audio file and the original audio file, removing, extra edited frames of processed audio from the original audio file, determining similarity measure, by applying a correlation coefficient between un-warped processed audio and original audio file and calculating, by SAD search, signature measure between un-warped processed audio and the original audio file, and performing, histogram analysis of SAD search vectors for same signature score calculation.

In an illustrative embodiment of the present invention, target output is achieved using different audio algorithms mentioned as follows:

ITU-R BS.1770 Audio Normalization:

There could be differences in loudness levels of the original sample and processed sample due to rms normalization. Hence, global loudness of −12.0 dBLKFS as well as short-term loudness audio normalization technique is applied for getting a better similarity measure between the test samples. Both the original audio and the processed audio are loudness normalized before initiating further comparison.

Figure 2:
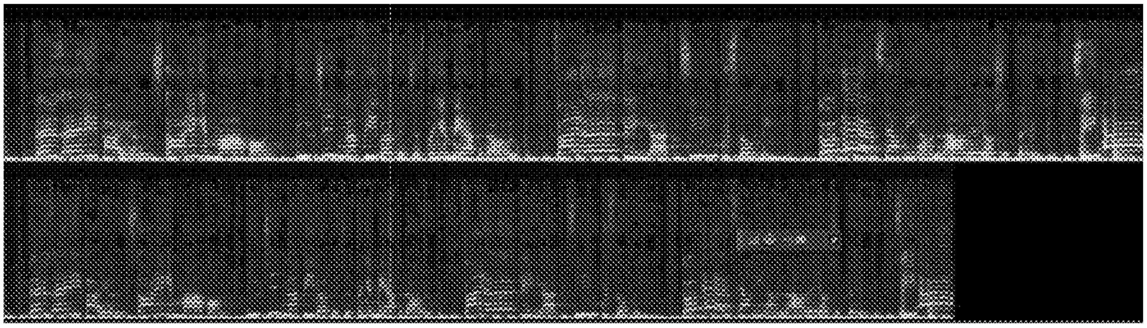
FIG. 2. Illustrates Spectral Images of an example original audio (top) and corresponding warped processed audio (bottom)

Time-Frequency Conversion (Spectral Image Computation):

Audio Pulse Code Modulation (PCM) samples are converted into Time-frequency mapping. 2048 size Odd Discrete Fourier Transform (ODFT) with 1024 overlapping is used for converting time samples to frequency bins for better frequency resolution. Real and imaginary ODFT coefficients are used for calculating power spectrum values in dB. The plot of power spectrum vs. time represents the spectral image of an audio file; FIG. 2. Illustrates the spectral image of an example original file and corresponding processed file which has undergone time scale dilation.

Spectral Image Scaling (Interpolation):

The processed spectral image, i.e., Power Spectral Density (PSD), is scaled up to get the same duration as the original spectral image. Different image filters could be used based on quality. Examples are bi-linear, bi-cubic, or edge-based filters.

Simple method is using linear interpolation which is $$PSD_{inter,bin} = (PSD_{t-1,bin} * \Delta_{right} + PSD_{t+1,bin} * \Delta_{left})/(\Delta_{right} + \Delta_{left})$$

Where as $\Delta_{right}$, $\Delta_{left}$ are distance of target interpolation location from right and left positions respectively.

Minimum SAD Searching:

The processed scaled-up sample is divided into slices with 740-millisecond duration each (32 frames). For each slice, searching for minimum SAD is done using the original spectral image as a reference. It is similar to the motion estimation (ME) search of an image block in past pictures but only in time direction.

Cost function is SAD which is as follows $$SAD_{i,shift} = \frac{1}{TF} \sum_{t=0}^{T} \sum_{f=0}^{F} \left| PSDproc_{i+t,f} - PSDorig_{i+t-shift,f} \right|$$

Minimum SAD for $i^{th}$ slice in processing audio is $$\min SAD_i = (SAD_{i,shift})$$

$$\text{where shift vary from} - 128 \text{ to } 128 \text{ frames}$$

Average of minimum SAD of all slices could be the similarity measure $$SM = \frac{1}{I} \sum_{i=0}^{I} \min SAD_i$$

Figure 3:
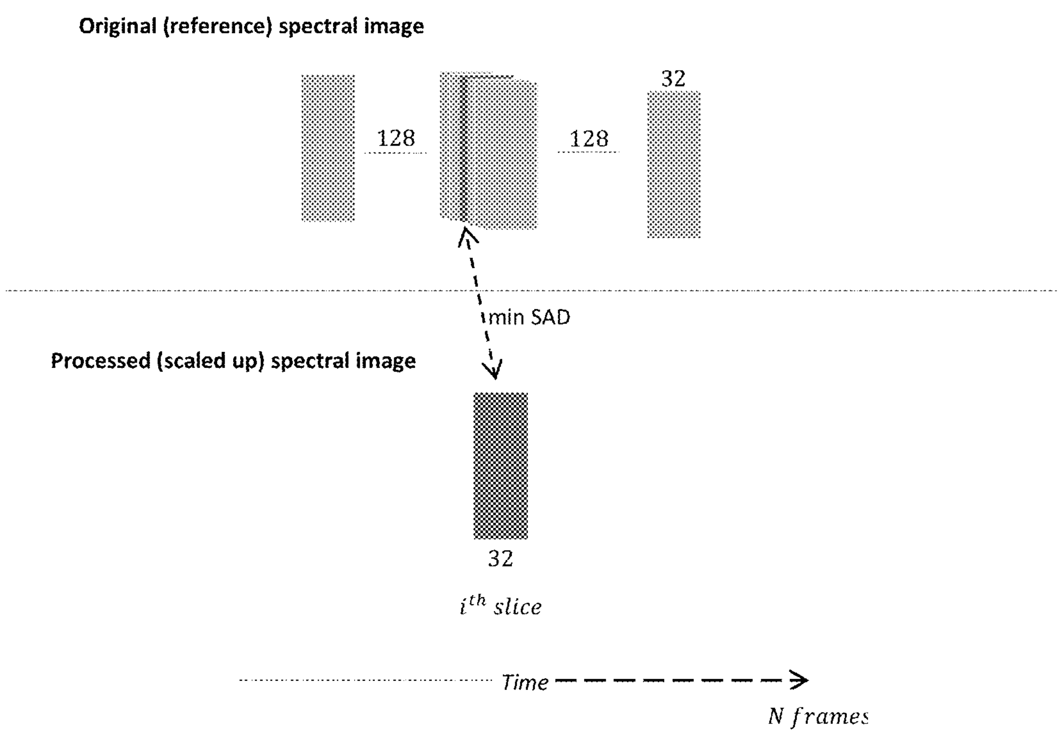
FIG. 3. Illustrates the mechanism of minimum SAD searching

FIG. 3. illustrates the computation of the SAD measure. Instead of SAD we can use any other cost searching function like MSE.

Estimation of Duration of Editing and Dilation Factor:

Let say,

Length of original file is N

Length of processed file is M

Initial cut is I in processed file

End cut is E in processed file

Dilation factor is DF

Target is to identify DF, I, E

Let say, k_proc is point in processed file k_orig is corresponding point in original file k_scal is point in scaled processed file with (scaled to N from M)

Relation is $$DF = N/(M + I + E)$$

$$\text{k\_orig} = (\text{k\_proc} + I) * DF$$

$$\text{k\_scal} = (\text{k\_proc}) * (N/M)$$

Using above equations relation between k_scal and k_orig will be $$\text{k\_orig} = (\text{k\_scal} * M + N * I)/(M + I + E)$$

Using SAD searching we can calculate many pairs of k_orig and k_scal

Using any two pairs we can calculate I and E $$I = (\text{k\_scal\_2} * \text{k\_orig\_1} - \text{k\_scal\_1} * \text{k\_orig\_2})/(\text{k\_orig\_2} - \text{k\_orig\_1}) * M/N$$

$$E = (\text{k\_scal\_2} - \text{k\_scal\_1})/(\text{k\_orig\_2} - \text{k\_orig\_1}) * M - M - I$$

$$DF = N/(M + I + E)$$

In first pass we have slightly bad estimation of DF because we have scaled the processed file assuming no editing. Hence second pass is required Now new equations will be $$DF' = N/(M + I' + E')$$

$$\text{k\_orig} = (\text{k\_proc} + I') * DF'$$

$$\text{k\_scal} = (\text{k\_proc}) * (DF)$$

$$I' = (\text{k\_scal\_2} * \text{k\_orig\_1} - \text{k\_scal\_1} * \text{k\_orig\_2})/(\text{k\_orig\_2} - \text{k\_orig\_1})/DF$$

$$E' = (\text{k\_scal\_2} - \text{k\_scal\_1})/(\text{k\_orig\_2} - \text{k\_orig\_1}) * N/DF - M - I'$$

$$DF' = N/(M + I' + E')$$

Let say processed file has silence frames in beginning and end ISp and ESp as compared to original file after editing $$I'' = I' + ISp$$

$$E'' = E' + ESp$$

The dilation factor remains the same because we are assuming that silence is added after the warping of the original. For better estimation of parameters, multiple pairs/points are used combined with mode.

Time Unwarping:

Based on the obtained dilation factor, lengths of audio edited in processing audio. The time unwarping technique is applied using the calculated dilation factor.

One simple method for unwarping is to convert audio in the frequency domain, and use a dilation factor for frequency and pitch estimation at new time locations for maintaining the original pitch. Reconstructing audio in the time domain with estimated frequencies and pitches. The advantage of interpolation in the frequency domain is that while reconstructing the signal using the overlap method, block artifacts are removed.

Figure 4:
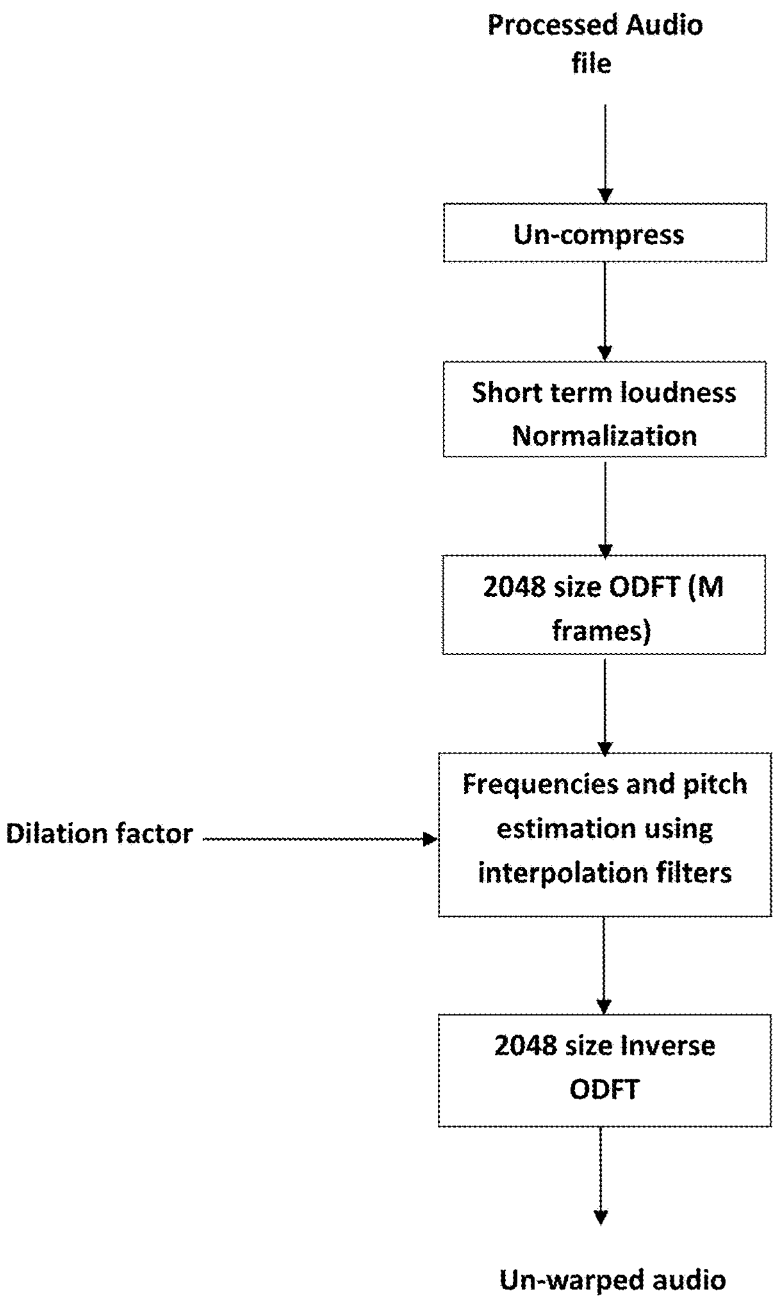
FIG. 4 illustrates a block diagram of Audio un-warping of the processed audio file, in accordance with an embodiment of the present invention.

Further, FIG. 4 shows a block diagram of Audio unwarping of the processed audio file, in accordance with an embodiment of the present invention. This figure shows uncompressing of the processed audio file, short-term loudness normalization of the uncompressed processed audio file, and conversion of the processed audio into Time-frequency mapping. 2048 size Odd DFT with 1024 overlapping is used for converting time samples to frequency bins for better frequency resolution. FIG. 2 further shows frequencies and pitch estimation using interpolation filters based on the dilation filter, and size inversing for obtaining the final unwrapped audio sample.

Conventional Correlation Measure for Similarity:

Correlation coefficient is used for getting a similarity measure between un-warped processed audio and original audio. But before using the correlation method, remove extra edited frames of processed audio from the original audio. Un-warped processed audio and edited original audio are divided into spectrum slices with duration T Frames in each slice. F is total number of frequency bins in the spectrum.

2D-Correlation coefficient for a slice is $$\rho_i = \frac{\sum_{t=0,f=0}^{T,F} orig(t,f) * proc_{unwarped}(t,f)}{\left(\sum_{t=0,f=0}^{T,F} orig(t,f) * orig(t,f)\right) * \left(\sum_{t=0,f=0}^{T,F} proc_{unwarped}(t,f) * proc_{unwarped}(t,f)\right)}$$

Final similarity measure could be average of all 2D correlation coefficients $$SM = \frac{1}{I}\sum_{i=0}^{I} \rho_i$$

New Same Signature Similarity Measure:

Same signature measure is calculated between un-warped processed audio and original audio using SAD search. But before that, cut extra edited frames of processed audio from the original audio.

Un-warped processed audio and edited original audio is divided into spectrum slices with duration T Frames in each slice.

SAD search is performed between each spectrum slice of Un-warped processed audio and original audio across time only (with a max search distance 128 frames). A Histogram of best positions with minimum cost is calculated. A Histogram of the delta of these positions is also calculated. Let say distance_histogram and distance_delta_histogram are generated. Weighted array matchscoreDist=[100, 95, 90, 85, 80, 75, 60, 50, 30, 10] is used for calculating same signature score. The match score will be the dot product of distance_histogram and matchscoreDist.

$$matcscore = \sum_{i=0}^{10} matchscoreDist[i] * \text{distance\_histogram}[i]$$

$$\text{matcscore\_delta} = \sum_{i=0}^{10} matchscoreDist[i] * \text{distance\_delta\_histogram}[i]$$

If matcscore_delta is greater than matcscore, it will be final same signature score otherwise matcscore is the final score. If processed and original audio is a similar type of audio but processed is too distorted, then the coherence measure of similarity could be low. But the same signature score will come high.

matcscore_delta is used because in some cases dilation factor is not constant and is jittery (or dilation factor estimation has some delta error). In this case, SAD search positions will increase linearly over time. Hence matcscore will come low but the delta score will be good.

Reference Point Mapping:

Relation is $$\text{k\_orig} = (\text{k\_proc} + I) * \text{dilation\_factor}$$

Knowing the dilation factor and edited duration I, the corresponding point can be easily computed.

Decide reference points in processed audio and apply the above equation.

But dilation_factor is the average estimation for the full sample. Hence SAD search on the spectrum is applied on top of the above equation to get the perfect mapping.

Figure 5:
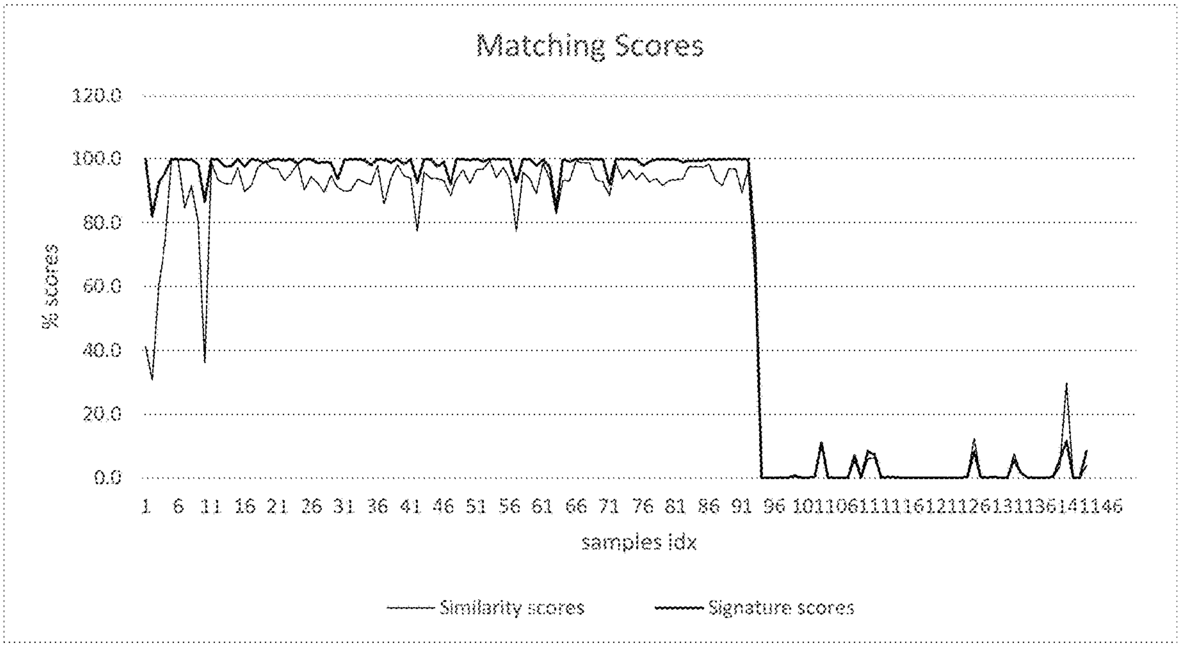
FIG. 5 illustrates the robustness of the new Same Signature measure to variations in audio (i.e., processing and/or slightly different performance). The new Same Signature (blue-line) is compared to conventional correlation-based similarity measure (red-line) for 150 audio file pairs, first 100 of which are known to be same music and 50 are completely different.

Experimental Data:

The above-mentioned matching algorithm is tested on 100 cases of original and corresponding processed samples in the database and the new Same Signature similarity score came always high as opposed to conventional correlation-based similarity score. It reported low Same Signature scores only in cases where a big chunk of audio was missing from the processed audio or music is a substantially different re-mix with different instruments or vocals, or the singer's performance is too different. Further, it was also verified for 50 cases of different original and processed samples, and in that it never reported high Same Signature score scores. FIG. 5. illustrate the two similarity measures for these 150 files. It may be noted that conventional correlation-based similarity score (red line) is low for many of the comparisons which should be reporting a good match. The figure illustrates both the robustness of the news Same Signature similarity measure (blue line) and the vulnerability of the conventional measure (red line) to processing and other modifications.

Below mentioned are a few non-limiting future applications of the disclosed method and system:

1. Music segmentation: Music segmentation could be done based on spectrum SAD search within a sample or song.
2. Music clustering: Spectrum-based SAD analysis cost and correlation analysis cost between segments of music could be deciding factors for creating clusters. Low cost implies closeness between segments of music and could be put in the same clusters.
3. Signal transition detector: Local Cost measures could be used for detecting signal type change.
4. Voice Activity Detection (VAD): Could be useful in voice activity detection in speech signal.
5. Vocal tagging: A karaoke filter can be applied on a track (consisting of vocal and music). The only music track will have low vocals present and some music will also lose. On this music-only track and the original track, matching analysis can be applied to get an idea where vocals are present in the original track. Vocal tagging is beneficial and could be helpful for controlled processing.
6. Music extraction filter: After vocal tagging, in the second pass karaoke analysis can be applied only where voice is present to get better music-only tracks.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

System modules, processes, operations, and algorithms described herein may comprise of hardware, software, firmware, or any combination(s) of hardware, software, firmware suitable for implementing the functionality described herein. Those of ordinary skill in the art will recognize that these modules, processes, operations, and algorithms may be implemented using various types of computing platforms, network devices, Central Processing Units (CPUs), Digital Signal Processors (DSPs), Field Programmable Gate Arrays (FPGAs), operating systems, network devices, or the like. These may also be stored on a tangible medium in a machine-readable series of instructions.

We claim:

1. A method for identifying similarity between two audio tracks, said method comprising:
- receiving a target audio track and an original audio track;
- applying global loudness normalization on one or both of the target audio track and the original audio track;
- converting the target audio track and the original audio track into spectral images using time-frequency mapping, thereby producing a target spectral image and an original spectral image;
- dividing the target spectral image and the original spectral image into one or more slices;
- for each of the one or more slices, searching for a minimum distance between one or more translations of the target spectral image and the original spectral image, thereby producing a set of minimum distances; and,
- determining, from the set of minimum distances, a similarity score between the target audio track and the original audio track based on at least one of (i) a correlation measure or (ii) a statistical analysis of the set of the minimum distances.

2. The method of claim 1, wherein each minimum distance is computed using a sum-of-absolute-differences (SAD) metric.

3. The method of claim 1, wherein determining the similarity score comprises determining the score using segments of the target audio track and the original audio track that are trimmed in accordance with editing parameters, the editing parameters comprising at least one of an initial cut, a final cut, an initial silence, and a final silence, the editing parameters being determined by mapping start and end reference points of the original audio track to corresponding reference points of the target audio track.

4. The method of claim 1, further comprising determining a time dilation factor between the original audio track and the target audio track.

5. The method of claim 4, wherein the time dilation factor is used to time unwarp the target audio track before determining the similarity score.

6. The method of claim 1, further comprising applying short term loudness normalization to one or both of the original audio track and the target audio track, prior to determining the similarity score.

7. The method of claim 1, wherein the target audio track and the original audio track are in Pulse code Modulation (PCM) recorded format.

8. The method of claim 1, wherein at least one of the target audio track and the original audio track are in a compressed format and an audio compression decoder is applied to convert each of the compressed format track into a PCM format track before other operations.

9. A system for identifying similarity between two audio tracks, said system comprising:

a processor that is configured to:
- receive a target audio track and an original audio track;
- apply global loudness normalization on one or both of the target audio track and the original audio track;
- convert the target audio track and the original audio track into spectral images by time-frequency mapping, thereby producing a target spectral image and an original spectral image;
- divide the target spectral image and the original spectral image into one or more slices;
- for each of the one or more slices, search for a minimum distance between one or more translations of the target spectral image and the original spectral image, thereby producing a set of minimum distances; and,
- compute, from the set of minimum distances, a similarity score between the target audio track and the original audio track based on at least one of (i) a correlation measure or (ii) a statistical analysis of the set of the minimum distances.

10. A device for identifying similarity between two audio tracks, said device comprising a processor that is configured to:
- receive a target audio track and an original audio track;
- apply global loudness normalization on one or both of the target audio track and the original audio track;
- convert the target audio track and the original audio track into spectral images by time-frequency mapping, thereby producing a target spectral image and an original spectral image;
- divide the target spectral image and the original spectral image into one or more slices;
- for each of the one or more slices, search for a minimum distance between one or more translations of the target spectral image and the original spectral image, thereby producing a set of minimum distances; and,
- compute, from the set of minimum distances, a similarity score between the target audio track and the original audio track based on at least one of (i) a correlation measure or (ii) a statistical analysis of the set of the minimum distances.

* * * * *